(12) United States Patent
Ma

(10) Patent No.: US 7,025,313 B2
(45) Date of Patent: Apr. 11, 2006

(54) SIDE WING SUPPORT ADAPTOR ACCOMMODATING ACCESSORY OF TRIPOD

(75) Inventor: Chan-Min Ma, Taipei (TW)

(73) Assignee: Videopart, Inc., Taipei (TW)

( * ) Notice: Subject to any disclaimer, the term of this patent is extended or adjusted under 35 U.S.C. 154(b) by 0 days.

(21) Appl. No.: 10/407,524

(22) Filed: Apr. 3, 2003

(65) Prior Publication Data

US 2004/0195473 A1    Oct. 7, 2004

(51) Int. Cl.
*F16M 11/02*    (2006.01)

(52) U.S. Cl. .............................. 248/177.1; 248/292.12

(58) Field of Classification Search ............. 248/177.1, 248/187.1, 176.1, 292.12, 179.1; 376/419, 376/422, 424, 544
See application file for complete search history.

(56) References Cited

U.S. PATENT DOCUMENTS

| | | | | |
|---|---|---|---|---|
| 1,231,635 A | * | 7/1917 | Nelson ....................... 211/33 |
| 3,738,606 A | * | 6/1973 | Millen ........................ 248/449 |
| 3,863,945 A | * | 2/1975 | Dunstan ..................... 280/35 |
| 4,341,452 A | * | 7/1982 | Korling ....................... 396/428 |
| 4,348,034 A | * | 9/1982 | Welt ........................... 280/35 |
| 4,451,020 A | * | 5/1984 | Posso ......................... 248/183.3 |
| 5,275,364 A | * | 1/1994 | Burger et al. ............. 248/125.1 |
| 5,326,058 A | * | 7/1994 | Beaver et al. ............. 248/187.1 |
| 5,632,459 A | * | 5/1997 | Brett ......................... 248/122.1 |
| 6,027,085 A | * | 2/2000 | Ruther ....................... 248/187.1 |
| 6,042,277 A | * | 3/2000 | Errington ................... 396/419 |
| 6,116,554 A | * | 9/2000 | Wei ........................... 248/183.1 |
| 6,164,611 A | * | 12/2000 | Kuhnke ...................... 248/279.1 |
| 6,604,720 B1 | * | 8/2003 | Wilson ....................... 248/177.1 |
| 6,824,319 B1 | * | 11/2004 | Speggiorin ................. 396/428 |

* cited by examiner

*Primary Examiner*—A. Joseph Wujciak
(74) *Attorney, Agent, or Firm*—Blakely Sokoloff Taylor & Zafman

(57) ABSTRACT

A side wing support adaptor. The adaptor has an extension wing having an engagement end and an attachment end provided at opposite sides thereof, so as to provide additional space to be hung at a lateral side of the tripod. The attachment end of the extension wing is provided with a fastener for attaching to a four-way locking mechanism that may be mated with add-ons or attachments. The engagement end of the extension wing is provided with an engagement member accommodating an accessory of the tripod. In an embodiment, the engagement member includes the same number of holes as that on a base plate mounted on the tripod platform. In an alternative embodiment, the engagement member includes a substantially circular piece formed with a central opening, and having a first face and a second face opposite the first face each formed with a plurality of meshable teeth.

1 Claim, 6 Drawing Sheets

SIDE WING SUPPORT ADAPTOR ACCOMMODATING ACCESSORY OF TRIPOD

CROSS-REFERENCES TO RELATED APPLICATIONS

Not Applicable

STATEMENT REGARDING FEDERALLY SPONSORED RESEARCH OR DEVELOPMENT

Not Applicable

DESCRIPTION

1. Field of Invention

The invention relates to a side wing support adaptor accommodating an accessory of a tripod for attaching to a four-way locking mechanism that may be mated with add-ons or attachments, so as to provide more space around the tripod for receiving loose items during camera shooting.

2. Background

Video cameras are usually mounted on a tripod platform for stable manipulation and accordingly to obtain video of good quality. Video cameras, particularly the ones used professionally, are mounted on a tripod platform by way of a base plate. The base plate, mostly provided by the video camera supplier, serves as an adaptor for the video camera so that the camera can be quickly and easily mounted on and released from a tripod platform. When a video camera is to be mounted on a tripod platform, the base plate first joins the tripod platform, and then the video camera is mounted onto the base plate. Alternatively, the base plate can join the video camera before being mounted on the tripod platform. In addition, the tilting angle of the camera platform may be adjusted by a pan lock provided at one side of the camera platform. Once the tilting angle is adjusted, the pan bar of the tripod platform needs to be counter-adjusted so as to allow easy gripping by the operator.

As shown in FIG. 1a, the base plate 10 illustrated has already been mounted on a platform 110 of a tripod 12. The bottom of the video camera 14 includes a truncated triangle plate 16 with both sides each formed with a slope surface 17 and a U-shaped plate 18 with an indentation 20. The base plate 10 has a recess 22 with a dovetailed guide 24 at each of its two sides so that the truncated triangle plate 16 can slide to engage the dovetailed guide 24. The U-shaped plate 18 and a headed pin 26 serve as an auxiliary attachment force to engage the truncated triangle plate 16 with the dove-tailed guide 24, in which the headed pin 26 slidably inserts into the gap formed between the U-shaped plate 18 and the bottom surface of the video camera 14. The base plate 10 provided by the supplier of the video camera 14 is equipped with three screw holes 140, which have become standards for individual base plate supplier.

As further shown in FIG. 1b, the camera platform 110 illustrated is provided with a pan lock 115 at one side thereof. The camera platform 110 is further provided with a pan bar 120 at one side thereof. The pan par 120 includes a hand grip 122 having a gripping end 124 and an engaging end 125 at opposite ends thereof. The engaging end 125 is formed with a plurality of teeth 126 (not clearly shown) for meshing with corresponding teeth 114 formed on an engaging part 112 of the platform 110. The teeth 126 and 114 are constructed of radially extending ridges and valleys. The radius of the engaging end 125 as well as the engaging part 112 and the number of teeth are all dependent on the model of the platform or pan bar, for which a plurality of industrial standards have been adopted. Once the tilting angle is adjusted by the pan lock 115, the operator may adjust the pan bar 120 to a comfortable position prior to shooting. The adjustment of the pan bar 120 is as follows. The operator may first unscrew the screw rod 127 passing through the engaging end 125 of the hand grip 122 and the engaging part 112 of the platform 110, then swivel the gripping end 124 to a comfortable position, and finally screw the screw rod 127 back to the engaging part 112.

Usually, many add-ons or attachments are provided around the tripod or the platform. For example, a tote box may be hung at the from end of the platform for containing small loose items, such as exposure meters, light meters, additional lenses, or even cosmetics. If the platform is tilted towards the front, the overall weight of the tote box including the loose items received therein may cause unbalancing of the tripod, thereby resulting in tipping over of the tripod. Anything like this is devastating, as the video camera is usually very expensive.

Therefore, a device for providing additional space to be hung at a lateral side of the tripod for receiving loose items during camera shooting is thus needed.

SUMMARY OF INVENTION

It is an object of the present invention to provide a side wing support adaptor that satisfies the need of providing additional space to be hung at a lateral side of the tripod.

It is another object of the present invention to provide a side wing support adaptor that can accommodate an accessory of a tripod for attaching to a four-way locking mechanism that may be mated with add-ons or attachments.

It is a further object of the present invention to provide a side wing support adaptor that can accommodate a base plate of a tripod, without modifying the current design between the engagement of the base plate and the video camera.

It is a further object of the present invention to provide a side wing support adaptor that can accommodate a pan bar of a tripod, without modifying the current design between the engagement of the pan bar and the platform.

To achieve the above objects, the side wing support adaptor according to the present invention comprises: an extension wing having an engagement end and an attachment end provided at opposite sides thereof. The attachment end of the extension wing is provided with a fastening means for attaching to a four-way locking mechanism that may be mated with add-ons or attachments. The engagement end of the extension wing is provided with an engagement means accommodating an accessory of the tripod.

According to an embodiment of the present invention, the engagement means includes the same number of holes as the base plate, so that the engagement means can be properly fastened to the base plate by way of screws.

According to another embodiment of the present invention, the engagement means includes a substantially circular piece formed with a central opening, and having a first face and a second face opposite the first face. The first face of the circular piece is formed with a plurality of teeth meshable with the teeth formed on the engaging end of the handgrip; the second face of the circular piece is formed with a plurality of teeth meshable with the teeth formed on the engaging part of the platform.

With the side wing support adaptor as described above, the side wing support adaptor may be fastened to the base plate, or sandwiched between the engaging part of the platform and the engaging end of the handgrip. In the second embodiment, the central opening of the circular piece allows the screw rod to pass through to be screwed to the engaging part of the platform.

The four-way locking mechanism may then be attached to the attachment end of the side wing support adaptor, wherein the four-way locking mechanism is then mated with add-ons or attachments, so as to provide more space around the tripod for receiving loose items during camera shooting.

BRIEF DESCRIPTION OF THE DRAWINGS

These and other modifications and advantages will become even more apparent from the following detained description of a preferred embodiment of the invention and from the drawings in which.

DETAILED DESCRIPTION OF THE INVENTION (PREFERRED EMBODIMENTS)

Figure 1A:
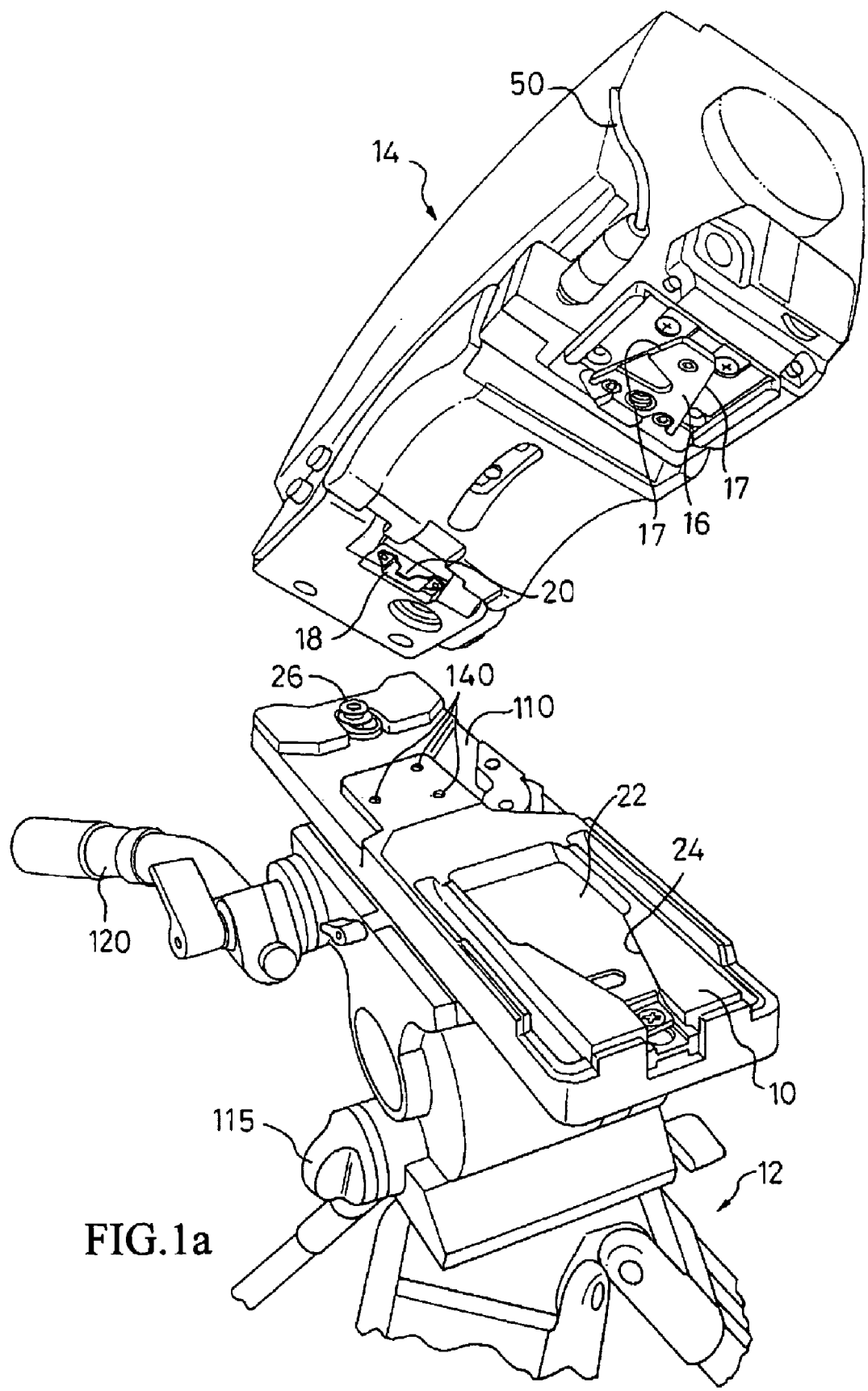
FIG. 1a shows the bottom of a video camera and a base plate mounted on a tripod platform.
Figure 1B:
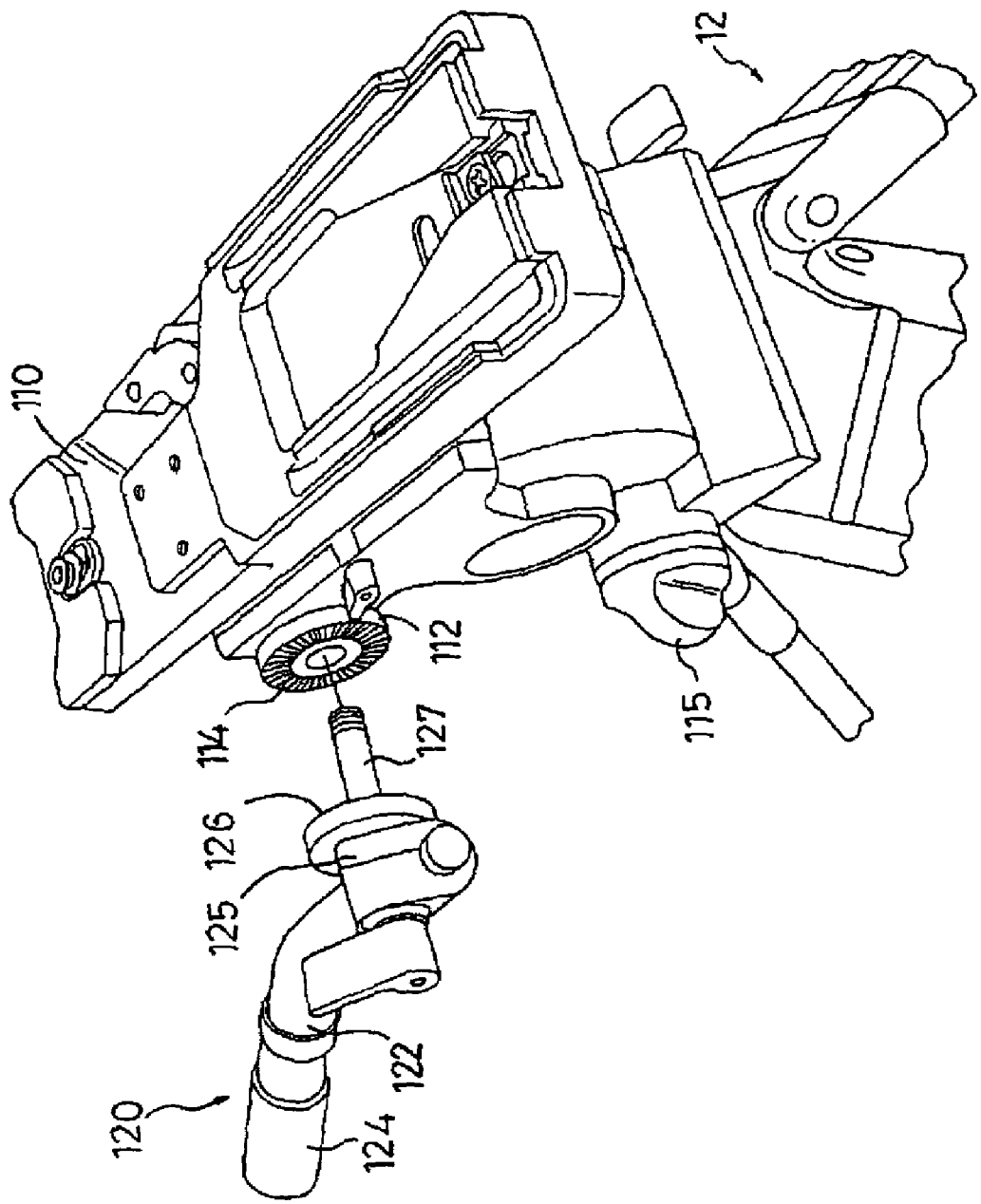
FIG. 1b shows a platform of a tripod for mounting a video camera.
Figure 2A:
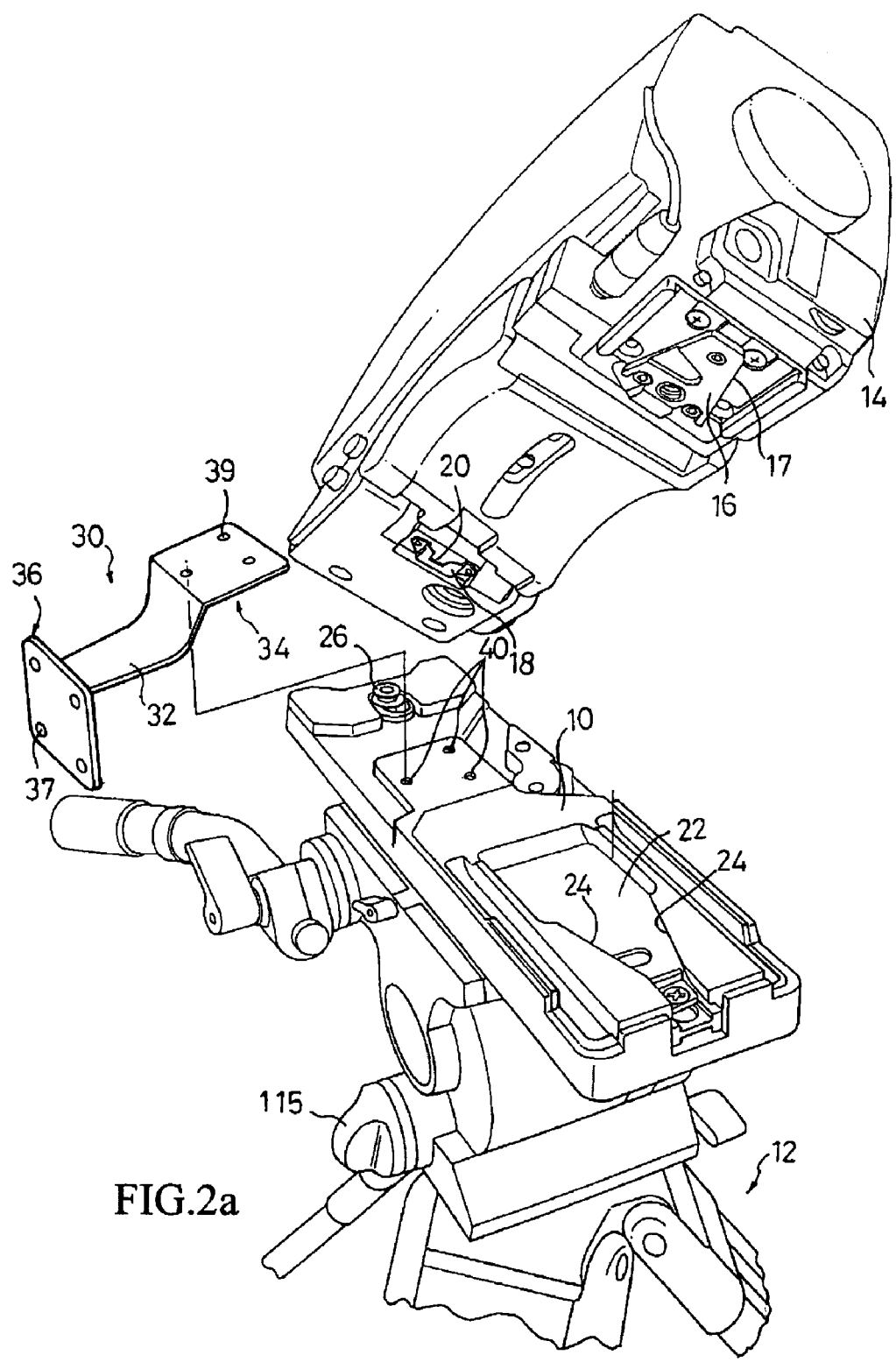
FIG. 2a shows a first embodiment of the side wing support adaptor of the present invention being fastened to the base plate.
Figure 2B:
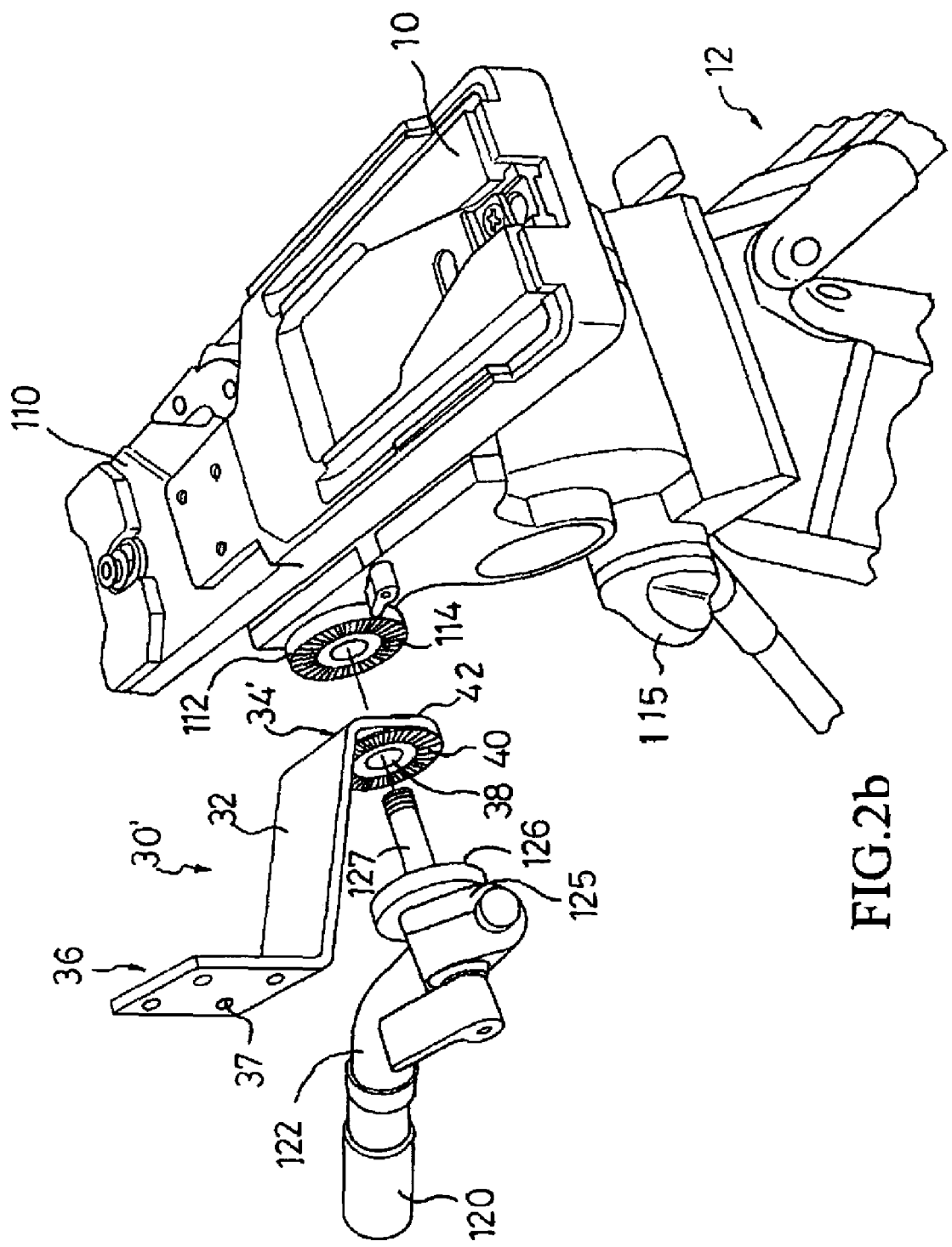
FIG. 2b shows a second embodiment of the side wing support adaptor of the present invention being sandwiched between the pan bar and the platform.

Referring to FIGS. 2a and 2b, a first embodiment and a second embodiment of the side wing support adaptor 30 accommodating an accessory of a tripod 12 according to the present invention are illustrated, respectively.

The side wing support adaptor according to the present invention generally comprises: an extension wing having an engagement end and an attachment end provided at opposite sides thereof. The attachment end of the extension wing is provided with a fastening means for attaching to a four-way locking mechanism that may be mated with add-ons or attachments. The engagement end of the extension wing is provided with engagement means accommodating an accessory of the tripod.

Referring to 2a, the side wing support adaptor 30 in this embodiment is designed to accommodate a base plate 10 mounted onto the platform 12. The side wing support adaptor 30 accommodating a base plate 10 primarily includes: an extension wing 32 having an engagement end 34 and an attachment end 36 provided at opposite sides thereof.

Figure 3:
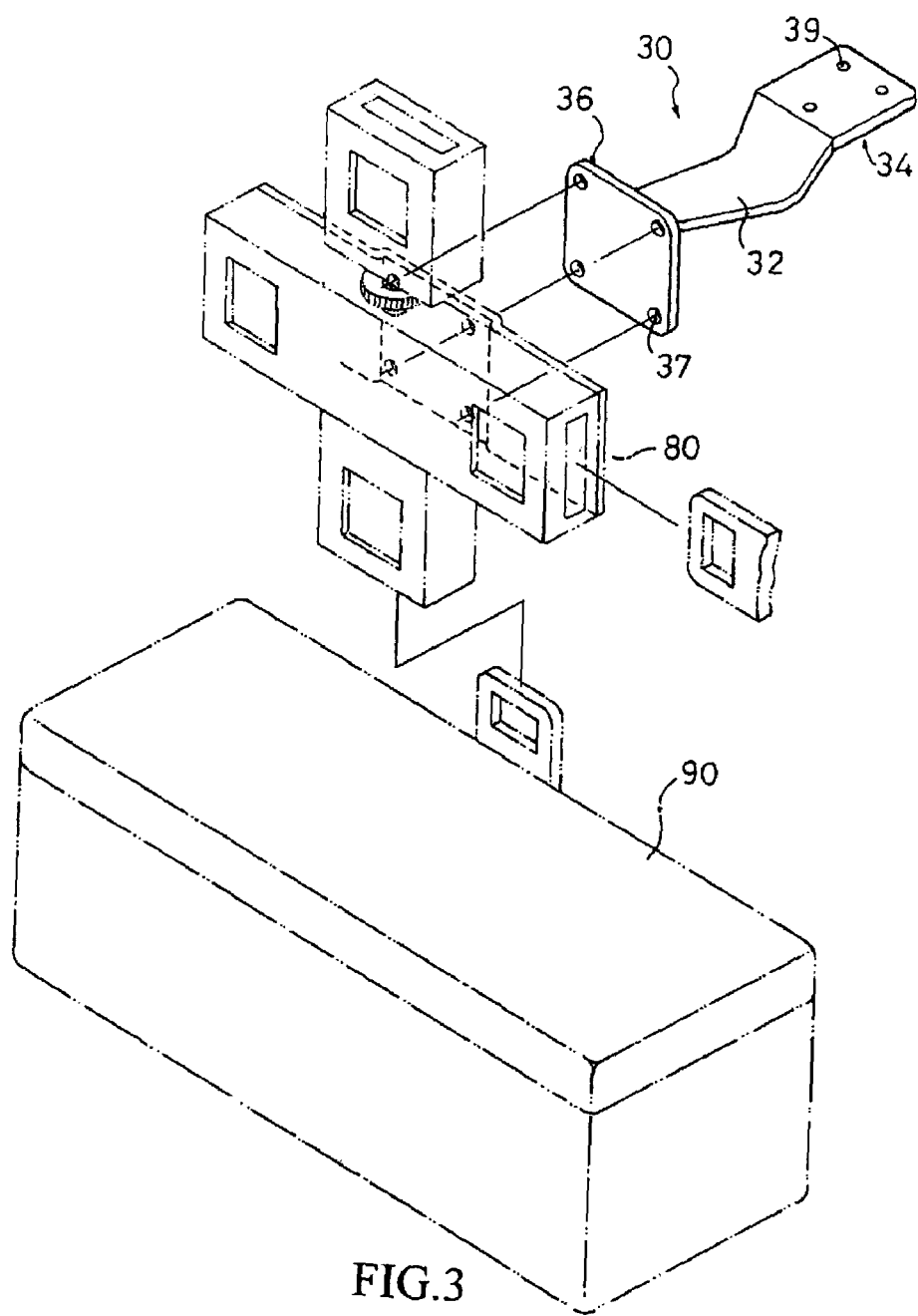
FIG. 3 is a schematic view illustrating an example of the add-on that may be attached to the first embodiment of the side wing support adaptor of the present invention.

The attachment end 36 of the extension wing 32 is provided with a fastening means 37, such as a plurality of holes, for attaching to a four-way locking mechanism (80 in FIG. 3) that may be mated with add-ons or attachments (90 in FIG. 3).

The engagement means 34 of the extension wing 32 includes the same number of holes 39 as the base plate 10, so that the engagement means 34 can be properly fastened to the base plate 10 by way of screws.

In operation, the side wing support adaptor 30 is first fastened to the base plate 10 by screws, before the video camera 14 slides to lock onto the base plate 10, as shown in FIG. 2a.

Referring to FIG. 2b, the side wing support adaptor 30' in this embodiment is designed to accommodate a pan bar 120 of a tripod platform 110. The support adaptor 30' primarily includes: an extension wing 32 having an engagement end 34' and an attachment end 36 provided at opposite sides thereof.

Like the first embodiment, the attachment end 36 of the extension wing 32 is provided with a fastening means 37, such as a plurality of holes, for attaching to a four-way locking mechanism (80 in FIG. 3) that may be mated with add-ons or attachments (90 in FIG. 3).

Figure 2C:
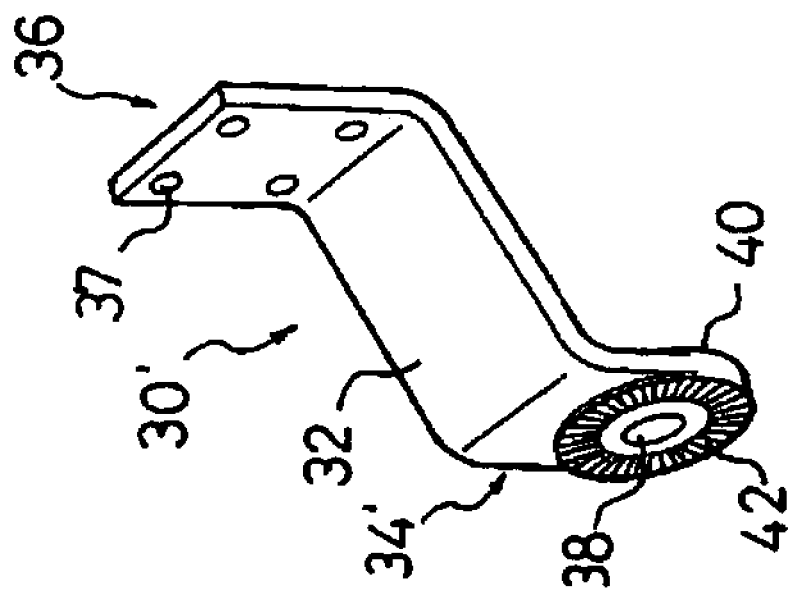
FIG. 2c shows the second embodiment of the side wing support adaptor of the present invention being viewed from an angle different from that in FIG. 2b.

In this embodiment, however, the engagement end 34' of the extension wing 32 is of a substantially circular piece formed with a central opening 38, and having a first face and a second face opposite the first face. On the first face of the circular piece is formed with a plurality of teeth 40 meshable with the teeth 126 (not clearly shown) formed on the engaging end 125 of the handgrip 122. On a second face of the circular piece opposite the first face is formed with a plurality of teeth 42 (best seen FIG. 2c) meshable with the teeth 114 formed on the engaging part 112 of the platform 110.

Like the teeth 126 and 114 formed on the engaging end 125 and engaging part 112, respectively, the teeth 40 and 42 are constructed of radially extending ridges and valleys. The radius of the circular piece is preferably consistent with the engaging end 125 and the engaging art 112 of the platform 110.

The attachment end 36, the wing extension 32 and the engagement end 34, 34' of the side wing support adaptor 30, 30' are preferably joined to construct a zigzag configuration, such that after the engagement end 34, 34' is fastened to the base plate 10 meshes with the platform 110 and the pan bar 120, the wing extension 32 extends sideward from the platform 110.

In operation, the side wing support adaptor 30' is sandwiched between the engaging part 114 of the platform 110 and the engaging end 125 of the hand grip 122, by first unscrewing the screw rod 127 passing through the engaging end 125 of the hand grip 122 and the engaging part 112 of the platform 110; removing the screw rod 127 and the pan bar 120, meshing the side wing support adaptor 30' with the engaging part 112 of the platform 110 by adjusting the orientation of the extension wing 32 to a desirable position and mating the teeth 42 formed at the second face of the circular piece with the teeth 114 of the engaging part 112; meshing the teeth 126 formed at the engaging end 125 of the hand grip 122 with the teeth 40 formed at the first face of the circular piece and swiveling the gripping end 124 to a comfortable position; and finally screwing the screw rod 127 back to the engaging part 112 of the platform 110 by passing through the central opening 38 formed on the circular piece. Persons skilled in the art should realize that, the screw rod 127 is of a length greater than the screw rod originally provided by the tripod supplier so as to be screwed back to the engaging part 112 of the platform.

Once the side wing support adaptor 30, 30' is in place, a four-way locking mechanism 80 as shown in FIG. 3 may be attached to the attachment end 36 of the side wing support adaptor 30, 30'. The four-way locking mechanism 80 is then mated with add-ons or attachments, such as a tote box 90 as shown in FIG. 3, so as to provide more space around the tripod for receiving loose items during camera shooting.

According to the present invention, the side wing support adaptor 30, 30' provides additional space to be hung at a lateral side of the tripod for being attached to add-ons or attachments. Because the add-ons or attachments are hung at the lateral side of the platform, the unbalancing of the tripod may be prevented while tilting the platform frontward.

It will thus be seen that the invention efficiently attains the objects set forth above, among those made apparent from the preceding description. Since certain changes may be made in the above constructions without departing from the scope of the invention, all matter contained in the above description or shown in the accompanying drawings are intended to be interpreted as illustrative and not in a limiting sense.

What is claimed is:

1. A side wing support adapter accommodating an accessory of a tripod, the side wing support adapter comprising: an extension wing having an engagement end and an attachment end provided at opposite sides thereof, wherein the attachment end is provided with a fastening means, and the engagement end includes an engagement means to be engaged to the accessory of the tripod, wherein the accessory is a pan bar formed with teeth for meshing with teeth formed on the tripod, and the engagement means includes: a substantially circular piece formed with a central opening and having a first face and a second face opposite the first face, on the first face being formed with a plurality of teeth meshable with the teeth of the accessory, on the second face being formed with a plurality of teeth meshable with the teeth of the tripod, wherein the wing extension extends sideward from the tripod, wherein the attachment end, the wing extension and the engagement end of the side wing support adapter are joined to construct a zigzag configuration, such that after the first face and second face of the engagement end mesh with the pan bar and tripod, respectively.

\* \* \* \* \*